(12) United States Patent
Sato

(10) Patent No.: US 6,456,447 B1
(45) Date of Patent: Sep. 24, 2002

(54) COLOR SEPARATING PRISM, AND PROJECTION DISPLAY APPARATUS AND CAMERA PROVIDED WITH SUCH PRISM

(75) Inventor: Masatoshi Sato, Machida (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/533,964

(22) Filed: Mar. 23, 2000

(30) Foreign Application Priority Data

Mar. 26, 1999 (JP) .......................................... 11-083899
Mar. 3, 2000 (JP) ...................................... 2000-058899

(51) Int. Cl.[7] ................................................ G02B 5/04
(52) U.S. Cl. ........................ 359/834; 359/633; 359/634
(58) Field of Search ................................ 359/633, 634, 359/618, 629, 630, 636, 638, 831, 833, 834; 353/33, 81

(56) References Cited

U.S. PATENT DOCUMENTS 5,777,674 A * 7/1998 Ohmuro ..................... 359/638
6,010,221 A    1/2000 Maki et al. ................... 353/33

* cited by examiner

Primary Examiner—Cassandra Spyrou
Assistant Examiner—Euncha Cherry
(74) Attorney, Agent, or Firm—Miles & Stockbridge P.C.

(57) ABSTRACT

In order to provide a color separating and composing prism, or the like, with an improved arrangement of prisms, and the like, having a gap or a space in the color separating and composing prism, to the exclusion of a registration shift, there is provided a color separating and composing prism consisting of first to third prisms 3, 4 and 5 for effecting color separation of a light source beam into an R light, a G light and a B light by the use of dichroic films, characterized in that the second surface of the first prism 3 and the first surface of the second prism 4, and the second surface of the second prism 4 and the first surface of the third prism 5 are respectively bound together along the joint surfaces therebetween at least through the adhesive layers, so that the first, second and third prisms are integrated.

26 Claims, 10 Drawing Sheets

FIG. 3

| SAMPLE No. | | 1 | 2 | 3 | 4 | 5 | 6 | 7 |
|---|---|---|---|---|---|---|---|---|
| COMPOSITION | $SiO_2$ (WEIGHT%) | 27.2 | 25.9 | 25.4 | 24.9 | 24.4 | 23.9 | 23.4 |
| | $Na_2O$ (WEIGHT%) | 0.5 | 0.9 | 0.9 | 0.9 | 0.9 | 0.9 | 0.9 |
| | $K_2O$ (WEIGHT%) | 1.0 | 0.9 | 0.9 | 0.9 | 0.9 | 0.9 | 0.9 |
| | PbO (WEIGHT%) | 71.0 | 72.0 | 72.5 | 73.0 | 73.5 | 74.0 | 74.5 |
| | $As_2O_3$ (WEIGHT%) | 0.3 | — | — | — | — | — | — |
| | $Sb_2O_3$ (WEIGHT%) | — | 0.3 | 0.3 | 0.3 | 0.3 | 0.3 | 0.3 |
| WAVELENGTH FOR MINIMUM ABSOLUTE VALUE OF PHOTO-ELASTIC CONSTANT (nm) | | 368 | 397 | 412 | 444 | 482 | 528 | 650 |
| REFRACTIVE INDEX | | 1.805 | 1.822 | 1.830 | 1.836 | 1.842 | 1.849 | 1.857 |

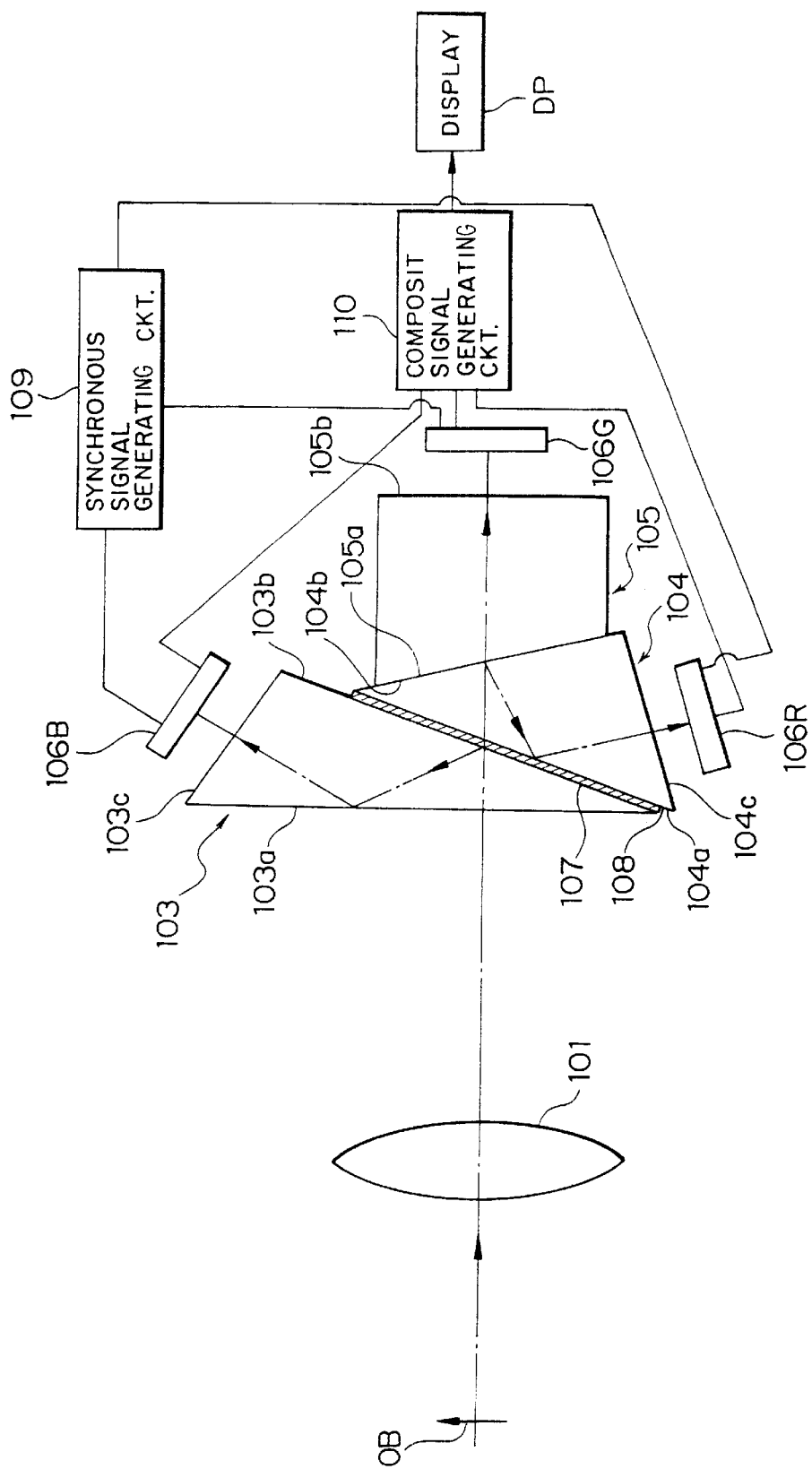

COLOR SEPARATING PRISM, AND PROJECTION DISPLAY APPARATUS AND CAMERA PROVIDED WITH SUCH PRISM

This application claims the benefit of Japanese Patent application Nos.11-083899 and 2000-058899 which are hereby incorporated by reference.

BACKGROUND OF THE INVENTION

1. Field of the Invention

The present invention relates to a color separating prism or a color separating and composing prism for color-separating a white light into a red component light, green component light, and blue component light (hereinafter called the R light, G light, and B light, respectively) or for color-composing the R light, the G light and the B light into one light, a full color projection display apparatus provided with reflection-type light valves respectively for the R light, the G light, and the B light, for modulating and emitting polarized light beams of the respective colors entering the respective light valves, for color-composing the respective modulated color light beams from the light valves through the color separating and composing prism so as to analyze to extract the color-composed light by use of an analyzing optical system, and for projecting the analyzed light by use of a projection lens, as well as a camera provided with such prism.

2. Related Background Art

As a conventional projection display apparatus, there is known, for example, a full color projection display apparatus disclosed in Japanese Patent No. 2505758. FIG. 9 is a diagram for showing the constitution of the projection display apparatus disclosed in FIG. 1 of the above patent. The conventional apparatus will be described below with reference to this diagram.

A light source beam emitted from a light source 23 is converted into a substantially parallel light beam through a shaping lens 22 to enter a polarizing beam splitter 21. The light source beam entering the polarizing beam splitter 21 is polarized and split into an S-polarized light which is reflected by a polarization and separation unit of this polarizing beam splitter and a P-polarized light which progresses through this polarization and separation unit. The S-polarized light is emitted from the polarizing beam splitter 21 to enter a color separating and composing prism consisting of a prism 11A, a prism 11B, and a prism 11C. Note that this color separating and composing prism comprises a dichroic film formed on a surface 11e of the prism 11A for reflecting the B light and transmitting the G light and the R light and another dichroic film formed on a joint surface between the prism 11B and the prism 11C for reflecting the R light and transmitting the G light. In addition, a gap is formed between the prism 11A and the prism 11B.

The light beam entering from the surface 11a of the prism 11A progresses through the prism 11A, and enters the B light reflecting dichroic film formed on the surface 11e, and is color-separated into the B light to be reflected, and a mixed light of the R light and the G light which are transmitted through this dichroic film to enter the prism 11B through the gap. The B light which is reflected by the B light reflecting dichroic film progresses through the prism 11A to be totally reflected by the surface 11a, and further progresses to exit from an exit surface 11b, and then enters a B light reflection-type light valve 12 which is provided in the vicinity of the exit surface. On the other hand, the mixed light of the transmitted R light and G light enters an R light reflecting dichroic film. The R light reflected by this film progresses through the prism 11B and is totally reflected by an entrance surface of the prism 11B and then exits from the exit surface 11c to enter an light valve 13 for the R light which is provided in the vicinity of the exit surface. The G light progressing through the prism 11C continues to progress through the prism 11C as it is to exit from a surface 11d, and enters a G light reflection-type light valve 14 which is provided in the vicinity of the exit surface.

The S-polarized light incident on the light valve of each color is subjected to modulation by the use of a color signal of the color, and a predetermined part of this light is converted into a P-polarized light, and is reflected as a mixed light with the S-polarized light which is a non-modulated light, to exit therefrom. The mixed light emitted from each light valve goes back in the above optical path to exit as a color composed light from the surface 11a of the prism 11A. This color composed light re-enters the polarizing beam splitter 21, whereby only the P-polarized light which is a modulated light of each color is analyzed and extracted as a transmitted light from the polarizing beam splitter. The analyzed light enters a projection lens 24 to form a full color projection image on a screen 25.

However, the conventional projection display apparatus mentioned above has a problem that pixels of the three light valves for the R light, the G light and the B light are projected on the screen in a shifted manner due to a change in the environment, vibration, or the like, that is, a so-called registration shift is generated. The present inventor has studied and examined a registration shift generated in the above projection display apparatus, to clarify the cause thereof. As a result, he found that such registration shift is caused by the air gap between the prism 11A and the prism 11B and a space between the polarizing beam splitter 21 and the prism 11A.

More specifically, a relative positional relation between each prism member of the composite prism and the polarizing beam splitter for forming the gap or the space is changed due to a change in the ambient temperature, a vibration, or the like, thereby causing such registration shift.

SUMMARY OF THE INVENTION

An object of the present invention is to provide a color separating prism with an improved arrangement of prisms or the like having the above gap or space in the color separating prism, to the exclusion of the registration shift, and to provide a projection display apparatus in which the composing prism and the polarizing beam splitter are used in combination, to the exclusion of the registration shift.

Another object of the present invention is to provide a camera which is capable of always obtaining a shot image having an excellent contrast.

In order to achieve the above objects, according to the present invention, there is provided a color separating prism which comprises:

a first prism provided with a first surface on which a light is incident, a second surface having a first color reflecting dichroic film for reflecting a first color light (B light) and transmitting a second color light (R light), and a third surface for emitting the first color light (B light);

a second prism provided with a first surface for transmitting the second color light (R light) which is transmitted through the second surface of the first prism, a second surface for reflecting the second color light (R light), and a third surface for emitting the second color light (R light) which is totally reflected by the first surface after being reflected by the second surface, and integrally fixed to the first prism by an adhesive; and a total reflection supporting layer provided between the second surface of the first prism and the first surface of the second prism to allow total reflection on the first surface of the second prism.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, an absolute value of a photoelastic constant of a glass material for forming the first prism and the second prism is preferably within a range of $1.5 \times 10^{-8}$ cm$^2$/N, at the wavelengths of the first color light (B light) and the second color light (R light).

According to the present invention, there is provided a color separating prism which comprises:

a first prism provided with a first surface on which a light is incident, a second surface having a first color reflecting dichroic film for reflecting a first color light (B light) and transmitting a second color light (R light) and a third color light (G light), and a third surface for emitting the first color light (B light);

a second prism provided with a first surface for transmitting the second color light (R light) and the third color light (G light) which are transmitted through the second surface of the first prism, a second surface having a second color reflecting dichroic film for reflecting the second color light (R light) and transmitting the third color light (G light), and a third surface for emitting the second color light (R light) which is totally reflected by the first surface after being reflected by the second surface, and integrally fixed to the first prism by an adhesive; and a third prism provided with a first surface for transmitting the third color light which is transmitted through the second surface of the second prism and a second surface for emitting the third color light (G light), and integrally fixed to the second prism by an adhesive.

According to the present invention, there is provided a projection display apparatus, comprising:

a polarizing device which converts a light from a light source into a polarized light beam having a predetermined direction of oscillation;

a color separating optical system which color-separates the polarized light beam emitted from the polarizing device into a first color light (B light), a second color light (R light), and a third color light (C light);

a first reflection-type light valve which modulates the direction of oscillation of the first color light (B light) and reflects this light;

a second reflection-type light valve which modulates the direction of oscillation of the second color light (R light) and reflects this light;

a third reflection-type light valve which modulates the direction of oscillation of the second color light (G light) and reflects this light;

a color composing optical system which composes the lights emitted from the first reflection-type light valve, the second reflection-type light valve, and the third reflection-type light valve; and an analyzing optical system which analyzes the light emitted from the color composing optical system, wherein the color composing optical system further comprises:

a first prism provided with a first surface on which the polarized light beam emitted from the polarizing device is incident, a second surface having a first color reflecting dichroic film for reflecting the first color light (B light) and transmitting the second color light (R light) and the third color light (G light), and a third surface for emitting the first color light (B light);

a second prism provided with a first surface for transmitting the second color light (R light) and the third color light (G light) which are transmitted through the second surface of the first prism, a second surface having a second color reflecting dichroic film for reflecting the second color light (R light) and transmitting the third color light (G light), and a third surface for emitting the second color light (R light) which is totally reflected by the first surface after being reflected by the second surface, and integrally fixed to the first prism by an adhesive;

a third prism provided with a first surface for transmitting the third color light (G light) transmitted through the second surface of the second prism and a second surface for emitting the third color light (G light); and a total reflection supporting layer provided between the second surface of the first prism and the first surface of the second prism to allow total reflection on the first surface of the second prism.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, an absolute value of a photoelastic constant of a glass material for forming the polarizing device, the first prism and the second prism is preferably within a range of $1.5 \times 10^{-8}$ cm$^2$/N, at the wavelengths of the first color light (B light) and the second color light (R light).

Also, in a preferred embodiment of the present invention, it is preferable that the first prism is integrally fixed to the polarizing device by an adhesive, and there is further provided a second total reflection supporting layer between the polarizing device and the first surface of the first prism, for allowing total reflection on the first surface of the first prism.

In a preferred embodiment of the present invention, a refractive index of the second total reflection supporting layer is preferably lower than that of the first prism.

Also, according to the present invention, there is provided a projection display apparatus, comprising:

a polarizing device which converts a light from a light source into a polarized light beam having a predetermined direction of oscillation;

a color separating optical system which color-separates the polarized light beam emitted from the polarizing device into a first color light (B light), a second color light (R light), and a third color light (G light);

a first reflection-type light valve which modulates the direction of oscillation of the first color light (B light) and reflects this light;

a second reflection-type light valve which modulates the direction of oscillation of the second color light (R light) and reflects this light;

a third reflection-type light valve which modulates the direction of oscillation of the second color light (G light) and reflects this light;

a color composing optical system which composes the lights emitted from the first reflection-type light valve, the second reflection-type light valve, and the third reflection-type light valve; and an analyzing optical system which analyzes the light emitted from the color composing optical system, wherein the color composing optical system comprises:
a first prism provided with a first surface on which the polarized light beam emitted from the polarizing device is incident, a second surface having a first color reflecting dichroic film for reflecting the first color light (B light) and transmitting the second color light (R light) and the third color light (G light), and a third surface for emitting the first color light (B light), and integrally fixed to the polarizing device by an adhesive;

a second prism provided with a first surface for transmitting the second color light (R light) and the third color light (G light) which are transmitted through the second surface of the first prism, a second surface having a second color reflecting dichroic film for reflecting the second color light (R light) and transmitting the third color light (G light), and a third surface for emitting the second color light (R light) which is totally reflected by the first surface after being reflected by the second surface;

a third prism provided with a first surface for transmitting the third color light (G light) transmitted through the second surface of the second prism and a second surface for emitting the third color light (G light); and a total reflection supporting layer provided between the polarizing device and the first surface of the first prism to allow total reflection on the first surface of the first prism.

Also, according to the present invention, there is provided a projection display apparatus, comprising:

a polarizing device which converts a light from a light source into a polarized light beam having a predetermined direction of oscillation;

a first prism provided with a first surface on which the polarized light beam emitted from the polarizing device is incident, a second surface having a first color reflecting dichroic film for reflecting the first color light (B light) and transmitting the second color light (R light) and the third color light (G light), and a third surface for emitting the first color light (B light), and integrally fixed to the polarizing device by an adhesive;

a second prism provided with a first surface for transmitting the second color light (R light) and the third color light (G light) which are transmitted through the second surface of the first prism, a second surface having a second color reflecting dichroic film for reflecting the second color light (R light) and transmitting the third color light (G light), and a third surface for emitting the second color light (R light) which is totally reflected by the first surface after being reflected by the second surface, and integrally fixed to the first prism by an adhesive;

a third prism provided with a first surface for transmitting the third color light (G light) which is transmitted through the second surface of the second prism and a second surface for emitting the third color light (G light), and integrally fixed to the second prism by an adhesive;

a first reflection-type light valve which modulates the direction of oscillation of the first color light (B light) emitted from the first prism and reflects this light;

a second reflection-type light valve which modulates the direction of oscillation of the second color light (R light) emitted from the second prism and reflects this light;

a third reflection-type light valve which modulates the direction of oscillation of the second color light (G light) emitted from the third prism and reflecting this light;

a color composing optical system which composes the lights emitted from the first reflection-type light valve, the second reflection-type light valve, and the third reflection-type light valve; and an analyzing optical system which analyzes the light emitted from the color composing optical system.

Also, according to the present invention, there is provided a camera, comprising:

an image forming optical system which forms an image of an object to be photographed;

a first prism provided with a first surface on which a light from the image forming optical system is incident, a second surface having a first color reflecting. dichroic film for reflecting a first color light (B light) and transmitting a second color light (R light), and a third surface for emitting the first color light (B light);

a second prism provided with a first surface for transmitting the second color light (R light) which is transmitted through the second surface of the first prism, a second surface for reflecting the second color light (R light), and a third surface for emitting the second color light (R light) which is totally reflected by the first surface after being reflected by the second surface, and integrally fixed to the first prism by an adhesive;

a total reflection supporting layer provided between the second surface of the first prism and the first surface of the second prism to allow total reflection on the first surface of the second prism;

a first image pick-up device provided at an image position of the image forming optical system which picks up an image of the object corresponding to the first color light (B light) emitted from the first prism to output a first image pick-up signal; and a second image pick-up device provided at the image position of the image forming optical system which picks up an image of the object corresponding to the second color light (R light) emitted from the second prism to output a second image pick-up signal.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, it is preferable to further comprise an image signal generating circuit 110 for generating an image signal on the basis of the first image pick-up signal and the second image pick-up signal.

Also, according to the present invention, there is provided a method of manufacturing a color separating prism comprising the steps of:

providing a first prism with a first surface on which a light is incident, a second surface having a first color reflecting dichroic film for reflecting a first color light (B light) and transmitting a second color light (R light), and a third surface for emitting the first color light (B light);

providing a second prism with a first surface for transmitting the second color light (R light) which is transmitted through the second surface of the first prism, a second surface for reflecting the second color light (R light), and a third surface for emitting the second color light (R light) which is totally reflected by the first surface after being reflected by the second surface, integrally fixed to the first prism by an adhesive; and providing a total reflection supporting layer between the second surface of the first prism and the first surface of the second prism to allow total reflection on the first surface of the second prism.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, an absolute value of a photoelastic constant of a glass material for forming the polarizing device, the first prism and the second prism is preferably within a range of $1.5 \times 10^{-8}$ cm$^2$/N, at the wavelengths of the first color light and the second color light.

According to the present invention, there is provided a method of manufacturing a color separating prism comprising the steps of:

providing first prism with a first surface on which a light is incident, a second surface having a first color reflecting dichroic film for reflecting a first color light and transmitting a second color light and a third color light, and a third surface for emitting the first color light;

providing a second prism with a first surface for transmitting the second color light and the third color light which are transmitted through the second surface of the first prism, a second surface having a second color reflecting dichroic film for reflecting the second color light and transmitting the third color light, and a third surface for emitting the second color light which is totally reflected by the first surface after being reflected by the second surface, integrally fixed to the first prism by an adhesive; and providing a third prism with a first surface for transmitting the third color light transmitted through the second surface of the second prism and a second surface for emitting the third color light, integrally fixed to the second prism by an adhesive.

According to the present invention, there is provided a method of manufacturing a projection display apparatus, comprising the steps of:

providing a polarizing device which converts a light from a light source into a polarized light beam having a predetermined direction of oscillation;

providing a color separating optical system which color-separates the polarized light beam emitted from the polarizing device into a first color light, a second color light, and a third color light;

providing a first reflection-type light valve which modulates the direction of oscillation of the first color light and reflects this light;

providing a second reflection-type light valve which modulates the direction of oscillation of the second color light and reflects this light;

providing a third reflection-type light valve which modulates the direction of oscillation of the second color light and reflects this light;

providing a color composing optical system which composes the lights emitted from the first reflection-type light valve, the second reflection-type light valve, and the third reflection-type light valve;

providing an analyzing optical system which analyzes the light emitted from the color composing optical system, wherein the step of providing the color composing optical system further comprises the steps of:

providing a first prism with a first surface on which the polarized light beam emitted from the polarizing device is incident, a second surface having a first color reflecting dichroic film for reflecting the first color light and transmitting the second color light and the third color light, and a third surface for emitting the first color light;

providing a second prism with a first surface for transmitting the second color light and the third color light which are transmitted through the second surface of the first prism, a second surface having a second color reflecting dichroic film for reflecting the second color light and transmitting the third color light, and a third surface for emitting the second color light which is totally reflected by the first surface after being reflected by the second surface, integrally fixed to the first prism by an adhesive;

providing a third prism with a first surface for transmitting the third color light transmitted through the second surface of the second prism and a second surface for emitting the third color light; and providing a total reflection supporting layer between the second surface of the first prism and the first surface of the second prism to allow total reflection on the first surface of the second prism.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, an absolute value of a photoelastic constant of a glass material for forming the polarizing device, the first prism and the second prism is preferably within a range of $1.5 \times 10^{-8}$ cm$^2$/N, at the wavelengths of the first color light and the second color light.

Also, in a preferred embodiment of the present invention, it is preferable that the first prism is integrally fixed to the polarizing device by an adhesive, and there is further comprised the step of providing a second total reflection supporting layer between the polarizing device and the first surface of the first prism, for allowing total reflection on the first surface of the first prism.

In a preferred embodiment of the present invention, a refractive index of the second total reflection supporting layer is preferably lower than that of the first prism.

Also, according to the present invention, there is provided a method of manufacturing a projection display apparatus, comprising the steps of:

providing a polarizing device which converts a light from a light source into a polarized light beam having a predetermined direction of oscillation;

providing a color separating optical system which color-separates the polarized light beam emitted from the polarizing device into a first color light, a second color light, and a third color light;

providing a first reflection-type light valve which modulates the direction of oscillation of the first color light and reflects this light;

providing a second reflection-type light valve which modulates the direction of oscillation of the second color light and reflects this light;

providing a third reflection-type light valve which modulates the direction of oscillation of the second color light and reflecting this light;

providing a color composing optical system which composes the lights emitted from the first reflection-type light valve, the second reflection-type light valve, and the third reflection-type light valve; and providing an analyzing optical system which analyzes the light emitted from the color composing optical system, wherein the step of providing the color composing optical system further comprises the steps of:

providing a first prism with a first surface on which the polarized light beam emitted from the polarizing device is incident, a second surface having a first color reflecting dichroic film for reflecting the first color light and transmitting the second color light and the third color light, and a third surface for emitting the first color light, integrally fixed to the polarizing device by an adhesive;

providing a second prism with a first surface for transmitting the second color light and the third color light which are transmitted through the second surface of the first prism, a second surface having a second color reflecting dichroic film for reflecting the second color light and transmitting the third color light, and a third surface for emitting the second color light which is totally reflected by the first surface after being reflected by the second surface;

providing a third prism with a first surface for transmitting the third color light transmitted through the second surface of the second prism and a second surface for emitting the third color light; and providing a total reflection supporting layer between the polarizing device and the first surface of the first prism to allow total reflection on the first surface of the first prism.

Also, according to the present invention, there is provided a method of manufacturing a projection display apparatus, comprising the steps of:

providing a polarizing device which converts a light from a light source into a polarized light beam having a predetermined direction of oscillation;

providing a first prism with a first surface on which the polarized light beam emitted from the polarizing device is incident, a second surface having a first color reflecting dichroic film for reflecting the first color light and transmitting the second color light and the third color light, and a third surface for emitting the first color light, integrally fixed to the polarizing device by an adhesive;

providing a second prism with a first surface for transmitting the second color light and the third color light which are transmitted through the second surface of the first prism, a second surface having a second color reflecting dichroic film for reflecting the second color light and transmitting the third color light, and a third surface for emitting the second color light which is totally reflected by the first surface after being reflected by the second surface, integrally fixed to the first prism by an adhesive;

providing a third prism with a first surface for transmitting the third color light transmitted through the second surface of the second prism and a second surface for emitting the third color light, integrally fixed to the second prism by an adhesive;

providing a first reflection-type light valve which modulates the direction of oscillation of the first color light emitted from the first prism and reflecting this light;

providing a second reflection-type light valve which modulates the direction of oscillation of the second color light emitted from the second prism and reflects this light;

providing a third reflection-type light valve which modulates the direction of oscillation of the second color light emitted from the third prism and reflects this light;

providing a color composing optical system which composes the lights emitted from the first reflection-type light valve, the second reflection-type light valve, and the third reflection-type light valve; and providing an analyzing optical system which analyzes the light emitted from the color composing optical system.

Also, according to the present invention, there is provided a method of manufacturing a camera, comprising the steps of:

providing an image forming optical system which forms an image of an object to be photographed;

providing a first prism with a first surface on which a light from the image forming optical system is incident, a second surface having a first color reflecting dichroic film for reflecting a first color light and transmitting a second color light, and a third surface for emitting the first color light;

providing a second prism with a first surface for transmitting the second color light which is transmitted through the second surface of the first prism, a second surface for reflecting the second color light, and a third surface for emitting the second color light which is totally reflected by the first surface after being reflected by the second surface, integrally fixed to the first prism by an adhesive;

providing a total reflection supporting layer between the second surface of the first prism and the first surface of the second prism to allow total reflection on the first surface of the second prism;

providing a first image pick-up device at an image position of the image forming optical system which picks up an image of the object corresponding to the first color light emitted from the first prism to output a first image pick-up signal; and providing a second image pick-up device at the image position of the image forming optical system which picks up an image of the object corresponding to the second color light emitted from the second prism to output a second image pick-up signal.

In a preferred embodiment of the present invention, a refractive index of the total reflection supporting layer is preferably lower than that of the second prism.

Also, in a preferred embodiment of the present invention, the total reflection supporting layer is preferably an adhesive for binding the first prism to the second prism.

Also, in a preferred embodiment of the present invention, it is preferable to further comprise the step of providing an image signal generating circuit which generates an image signal on the basis of the first image pick-up signal and the second image pick-up signal.

BRIEF DESCRIPTION OF THE DRAWINGS

FIG. 3 is a table for showing the composition and the optical characteristics of glass materials to be used for the prisms.

FIG. 10 is a diagram for showing the constitution of a camera according to a third embodiment of the present invention.

DETAILED DESCRIPTION OF THE PREFERRED EMBODIMENTS

Preferred embodiments of the present invention will be described below with reference to the attached drawings.

First Embodiment

Figure 1:
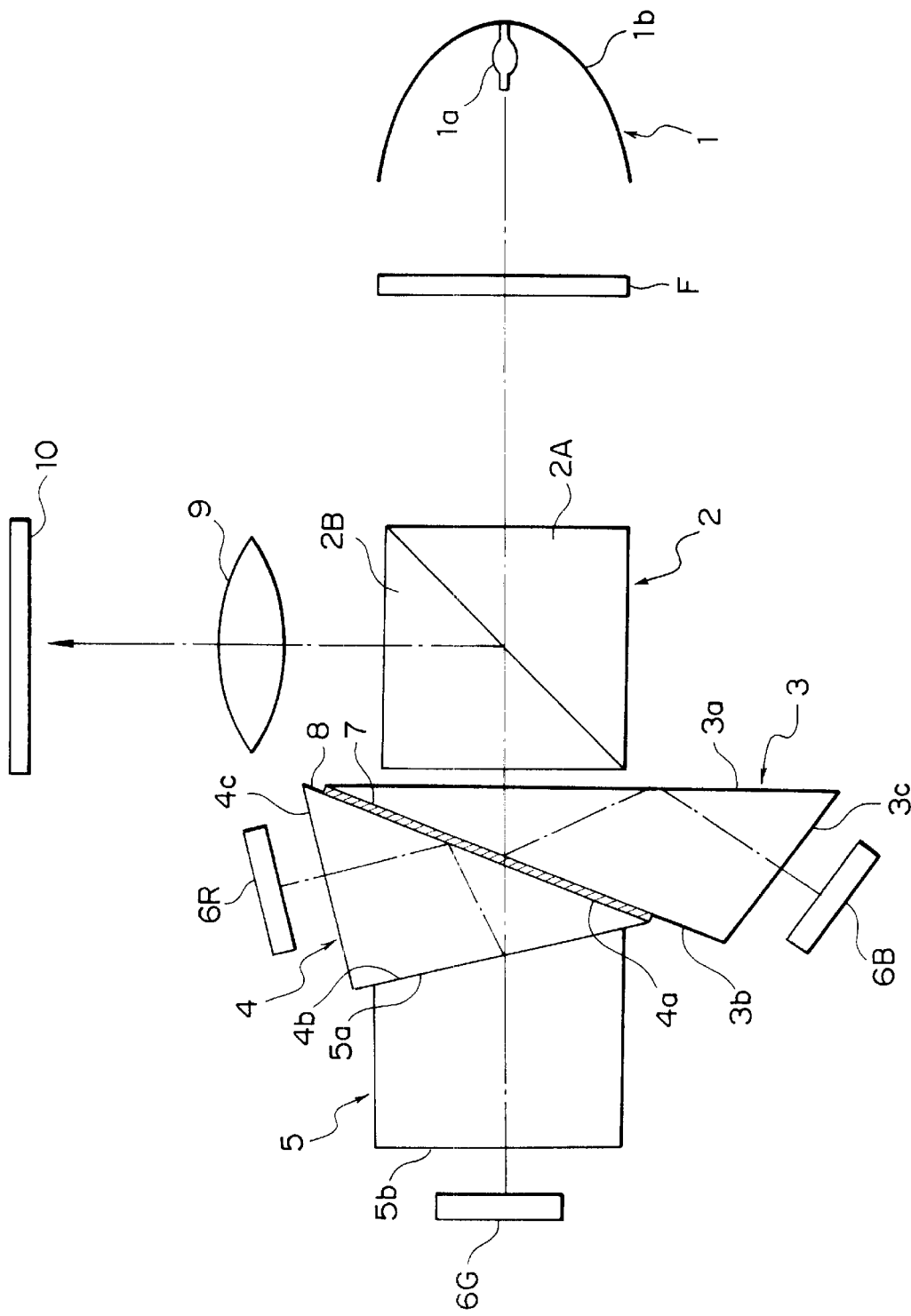
FIG. 1 is a diagram for showing the constitution of a projection display apparatus according to a first embodiment of the present invention.

FIG. 1 is a diagram for showing the constitution of a projection display apparatus according to the first embodiment. In FIG. 1, a substantially parallel light beam emitted from a light source 1 which is comprised of a lamp 1a and a parabolic concave mirror 1b is transmitted through a filter F for intercepting(shielding) ultraviolet rays and infrared rays and then enters a polarizing beam splitter 2 to be polarized and split into an S-polarized light and a P-polarized light. Here, a light emitted from the light source does not become a parallel light beam when this light source uses no parabolic mirror, so that it is desirable that the emitted light should be converted into a substantially parallel light beam by use of a shaping optical system. The polarizing beam splitter 2 on which the light source beam is incident is comprised of right-angled isosceles triangular prisms 2A and 2B which have the same form. On the bottom surface of the prism 2B, there is formed a polarizing beam splitting film, and this film surface and the bottom surface of the prism 2A are bound together by an adhesive to be integrally fixed to each other. A glass material for the prisms 2A, 2B used in the polarizing beam splitter 2 will be described later. In the projection display apparatus according to this embodiment, the S-polarized light is discarded not to be used and only the P-polarized light is used.

The P-polarized light emitted from the polarizing beam splitter 2 enters a color separating and composing prism which consists of a first prism 3, a second prism 4, and a third prism 5. On a surface 3b (second surface) of the prism 3, there is formed a B light reflecting dichroic film for reflecting the B light and transmitting the R light and the G light. Also, on a surface 4a (first surface) of the prism 4, there is formed total reflection supporting layer 8 for transmitting the R light and the G light and totally reflecting a light with a predetermined angle of incidence. Then, the total reflection supporting layer 8 and the B light reflecting dichroic film, which overlap as shown, are bound together along the entire joint surface therebetween (i.e., the entire overlap) through an adhesive layer 7 co-extensive with the entire overlap, so that the prism 3 and the prism 4 are integrated.

Figure 2:
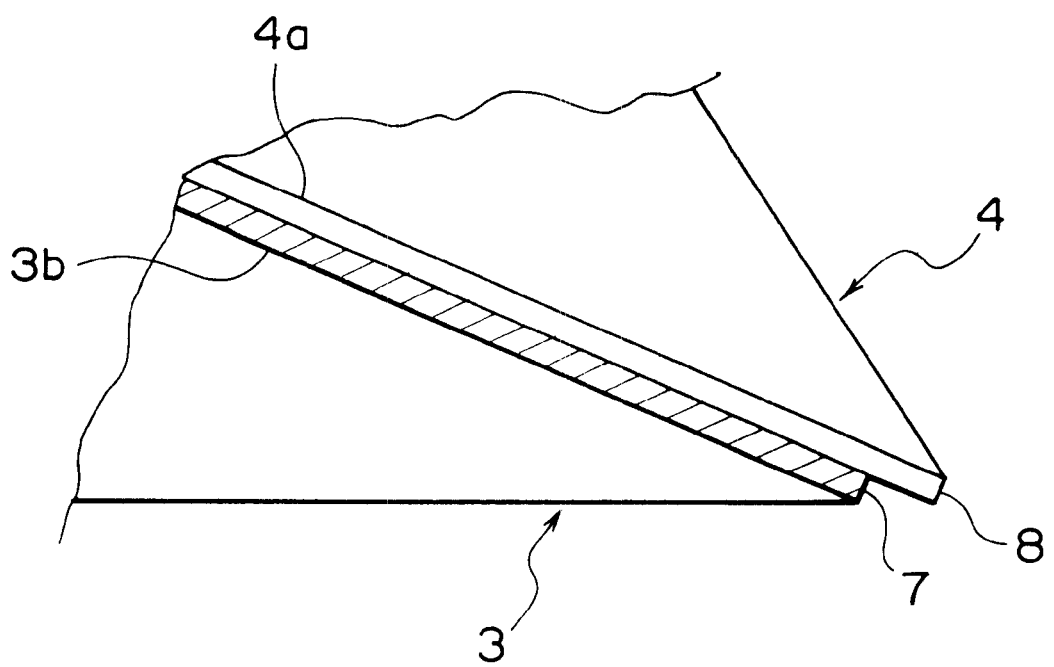
FIG. 2 is a diagram for explaining a joint portion between a prism 3 and a prism 4.

FIG. 2 is a diagram for explaining the joint surface between the prism 3 and the prism 4 in an enlarged manner. The adhesive layer 7 is formed between the B light reflecting dichroic film on the surface 3b of the prism 3 and the total reflection supporting layer 8 on the surface 4a of the prism 4. In addition, an ordinary optical adhesive may be used in this case as the above-mentioned adhesive. The adhesive layer 7 and the adhesive will be described later.

A surface 4b (second surface) of the prism 4 and a surface 5a (first surface) of the prism 5 are bound together to be integrated by means of an R light reflecting dichroic film formed on the surface 4b and the surface 5a which are bound together by an optical adhesive.

Next, the glass material used for the prisms 2A, 2B for constituting the polarizing beam splitter 2 and the prisms 3, 4 for constituting a composition prism will be described. In the present embodiment, it is preferable that the absolute value of a photoelastic constant of the glass material for constituting the beam splitter 2 and the prisms 3, 4 and 5 is within $1.5 \times 10^{-8}$ cm$^2$/N at the wavelength of a light which progresses inside the beam splitter, etc. It is possible to suppress a quantity of birefringence which is caused by a stress generated inside the prisms to the minimum, by using a glass material having such characteristic. As a result, a polarized state of a linear polarized light which progresses through the prisms does not changed.

Figure 4:
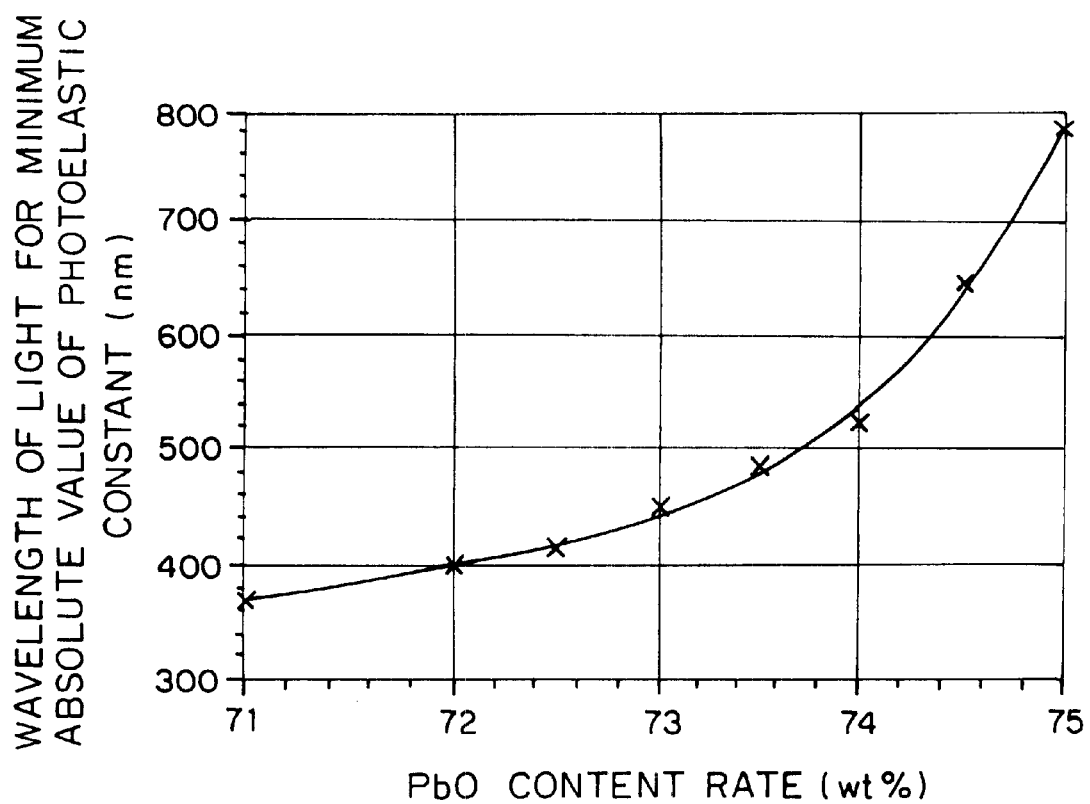
FIG. 4 is a graph for showing a relation between the main component PbO of a glass composition and a wavelength of a light for the minimum absolute value of a photoelastic onstant.
Figure 5:
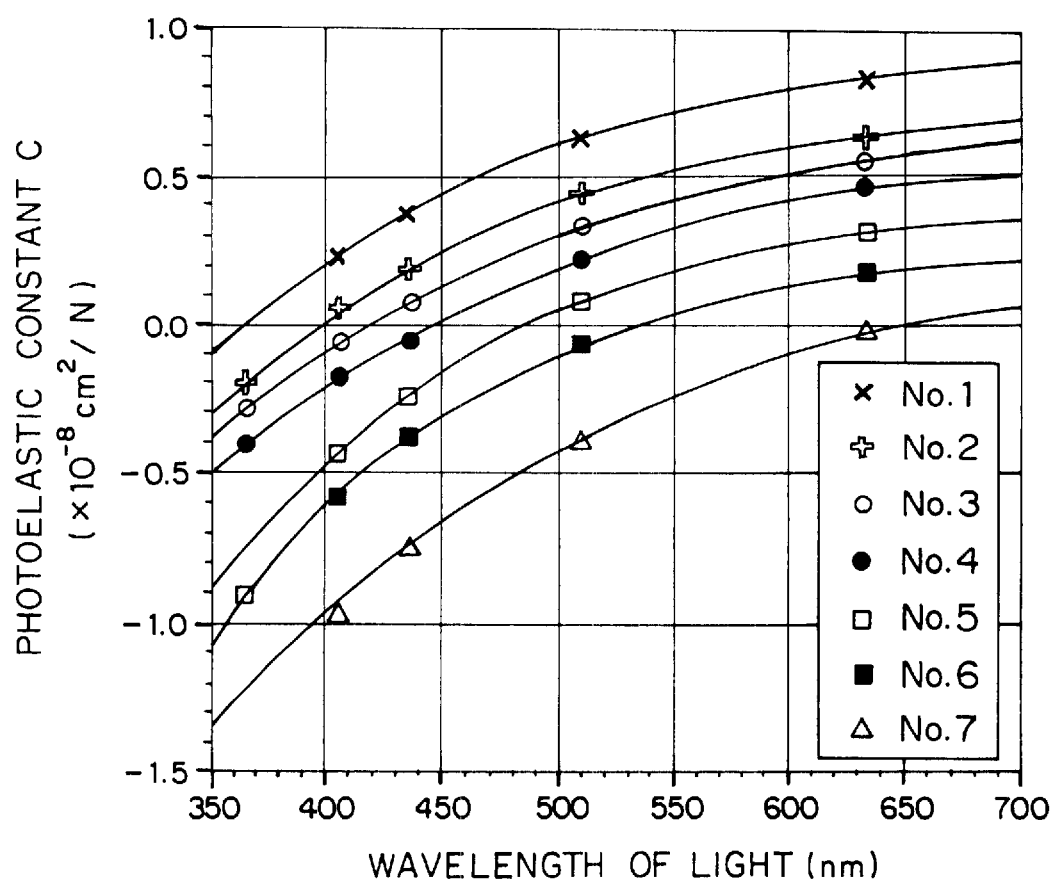
FIG. 5 is a graph for showing a relation between the photoelastic constant of each of the glass materials and the wavelength.

FIG. 3 is a table for showing seven examples of the glass material having the above-mentioned characteristic. Compositions and optical characteristic values such as refractive index, etc., of glass examples of the sample Nos. 1 to 7 are shown in this table. FIG. 4 is a graph for showing a correlation relation between the wavelength of a light at which the photoelastic constant of the glass examples of the sample Nos. 1 to 7 becomes substantially zero, that is, at which the photoelastic constant takes the minimum absolute value, and a PbO content rate for determining such value. FIG. 5 is a diagram for showing wavelength dependency of the photoelastic constants of the glass materials of the sample Nos. 1 to 7. As clearly seen from FIG. 5, with all of the glass materials of the sample Nos. 1 to 7, the absolute value of the photoelastic constant is within $1.5 \times 10^{-8}$ cm$^2$/N, so that all of the sample glass materials can be used as the glass material for constituting the prisms, etc. In this embodiment, the polarizing beam splitter 2, and the prisms 3, 4 and 5 for constituting the composition prism are formed by the use of the glass material of the sample No.6. Note that a photoelastic constant of a BK 7 material (having the refractive index of 1.519) which is usually used as the glass material is $2.78 \times 10^{-8}$ cm$^2$/N. As a result, it is not desirable to use the BK 7 material since, when the light beam passes through the prisms, etc., the polarized state of the light beam is changed owing to the birefringence of the BK 7 material.

Returning to FIG. 1, the P-polarized light which is polarized and split by the polarizing beam splitter 2 and enters the prism 3 from the surface 3a (first surface) side is color-separated into the B light which continues to progress as it is to be reflected by the B light reflecting dichroic film formed on the surface 3b (second surface) and the R light and the G light which continue to progress as they are, pass through the adhesive layer 7 and the total reflection supporting layer 8 and then enter the prism 4 from the surface 4a (first surface) side. The B light continues to progress and then is totally reflected by the surface 3a (first surface) and progresses further to exit from the surface 3c (third surface) to enter a B light reflection-type liquid crystal light valve 6B which is provided in the vicinity of the exit surface.

On the other hand, the R light and the G light which progress into the prism 4 via the adhesive layer 7 and the total reflection supporting layer 8 continue to progress to reach a joint surface between the surface 4b (second surface) of the prism 4 and the surface 5a (first surface) of the prism 5. The surface 4b has the R light reflecting dichroic film, and the surface 4b and the surface 5a are bound together along the entire joint surface through the adhesive layer, whereby the prism 4 and the prism 5 are integrated. Then, the light is color-separated into the R light which is reflected by the R reflecting dichroic film and the G light which continues to progress. The G light progresses as it is into the prism 5 to exit from the predetermined exit surface 5b, and then enters a G light reflection-type liquid crystal light valve 6G which is provided in the vicinity of the exit surface. Note that, in this embodiment, the prism 5 takes the form of a quadrangular prism. However, the form of the prism 5 is not limited to this, but may take the form of a triangular prism. If the prism 5 is a triangular prism, the G light does not progress straight into the prism to be emitted from the exit surface, but is totally reflected once by a slanting surface of the triangular prism to exit from a predetermined exit surface. However, the total reflection in this case is not related to the object of this invention.

The R light which is reflected by the R light reflecting dichroic film progresses as it is through the prism 4, and enters the surface 4a (first surface) of the prism 4 to be subjected to the total reflecting effect. The R light further progresses through the prism 4 to exit from the exit surface 4c (third surface) and then enters an R light reflection-type light valve 6R which is provided in the vicinity of the exit surface 4c. Note that details of the total reflecting effect on the surface 4a and the surface 3a will be described later.

Here, the reflection-type liquid crystal light valves 6R, 6G, and 6B will be described. The reflection-type liquid crystal light valves 6R, 6G and 6B used in this embodiment are electric writing reflection-type valves, in which a birefringence layer is formed by changing a molecular sequence of the liquid crystal of a liquid crystal layer corresponding to pixels corresponding to a predetermined part of the linear polarized light (P-polarized light) which is incident on each light valve on the basis of a color signal of each color.

Then, each light valve has a function of changing the direction of oscillation of the incident light to convert (modulate) in consequence the incident P-polarized light into a S-polarized light, thereby reflecting and emitting the S-polarized light. With such function, the S-polarized light as the modulated light and the P-polarized light as a non-modulated light corresponding to the unselected part are mixed in the light emitted from the light valve. In case of the electric writing light valve, a switching TFT is provided to be corresponding to each pixel and the TFT is switched by the above-mentioned color signal to give an electric field to the liquid crystal layer, thereby giving the above-mentioned function.

Note that there is also known a photo writing reflection-type light valve as a light valve of another scheme. However, this photo writing reflection-type light valve requires a writing optical system additionally, so that the entire size of the projection display apparatus is enlarged. The electric writing light valve is more advantageous in the terms of the size of the entire apparatus, with the reduced dimensions thereof. A mixed light of the modulated light and the non-modulated light reflected by and emitted from each of the light valves 6R, 6G and 6B for the respective colors goes counter to the incident optical axis thereof to progress through the color separating and composing prism to be subjected to color composition by means of each dichroic film, and then is emitted as a color composed light from the surface 3a (first surface) of the prism 3. It is clear that, if progressing counter to the incident optical axis, inside the composition prism, the R light is subjected to the total reflection on the surface 4a (first surface) of the prism 4 and the B light on the surface 3a (first surface) of the prism 3 only once, severally.

Then, the composed light emitted from the color separating and composing prism enters the polarizing beam splitter 2 from the prism 2B side, and is separated, or analyzed by reflecting the modulated light (S-polarized light) and transmitting the non-modulated light (P-polarized light) by means of the polarizing light separation unit. Out of these lights, the modulated light (analyzed light) is caused to enter a projection lens 9 and is projected onto a screen 10 as a full color image.

Next, a detailed description will be made on the total reflecting effect of the B light and the R light in the above-mentioned composing prism. A light generally progresses from a medium having a refractive index of no to a medium having a refractive index of $n_1$ ($n_0 > n_1$) at the angle of incidence $\theta 0$. If the angle of incidence is $\theta 1$, the following equation is established owing to Snell's law:

$$n_0 \times \sin(\theta 0) = n_1 \times \sin(\theta 1) \tag{1}$$

Here, if the condition for conducting a total reflection without refraction is to be obtained, it is required to satisfy the following equation:

$$\sin(\theta 0) > n_1 / n_0 \tag{2}$$

where $\sin(\theta 1) = 1$.

When the above B light is to be subjected to the total reflection on the surface 3a (first surface) of the prism 3, since $n_1$ is of the air and is 1.000, while no is 1.849, a value for $n_1/n_0$ becomes 0.541, and if the angle of incidence is 32.8 degrees or more with respect to the surface 3a from the above equation (2), the total reflecting condition is satisfied. In case of the BK7 glass, in comparison, since a value of $n_0$ is 1.519, the angle of incidence is required to be 41.1 degrees or more for the total reflection.

Figure 6:
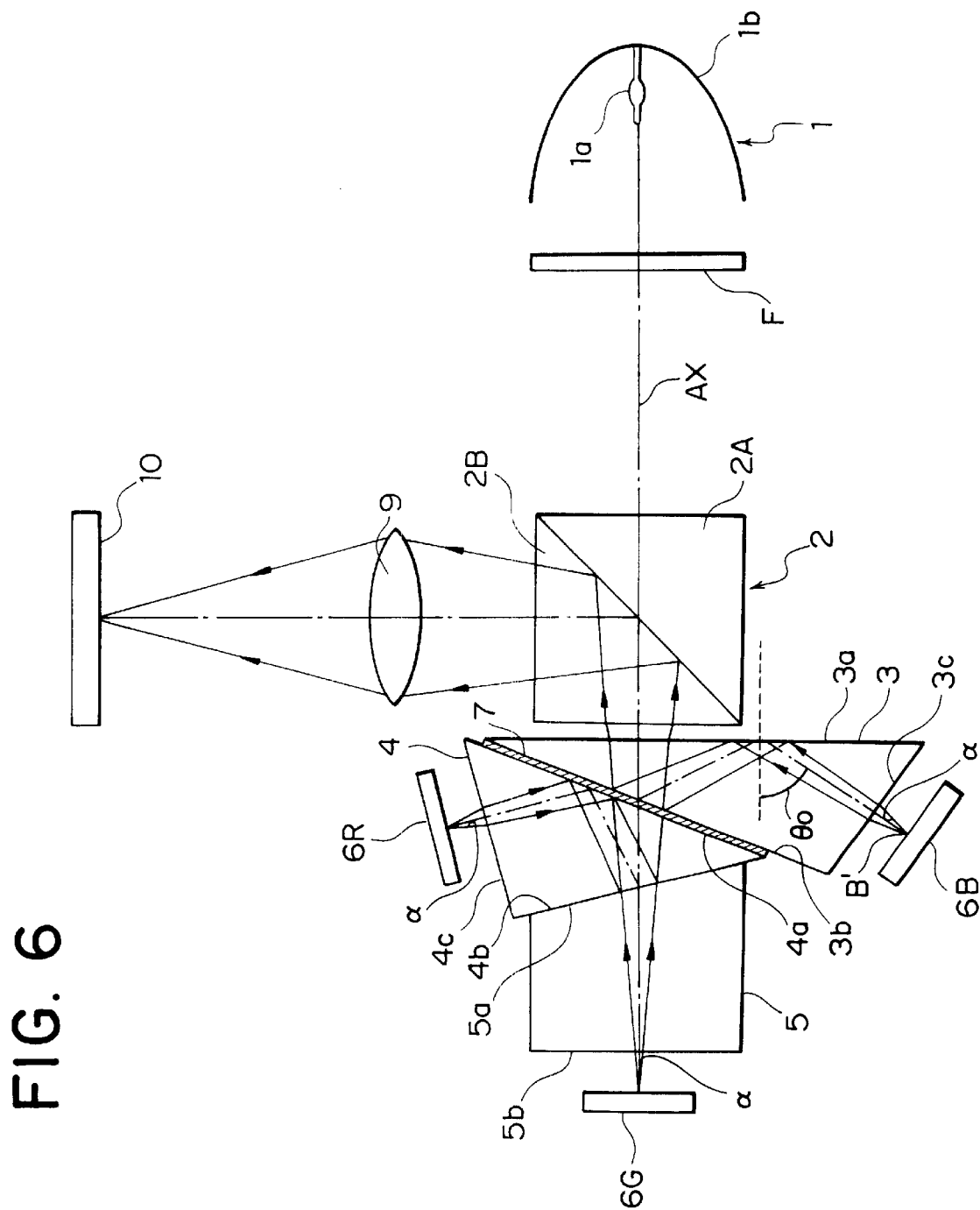
FIG. 6 is a diagram for showing a spread of a light beam (NA) in the projection display apparatus according to the first embodiment.

In the projection display apparatus shown in FIG. 1, the light valves 6R, 6G and 6B of the respective colors and a projection image on the screen 10 have a conjugate relationship with respect to the projection lens 9, and the light beam emitted from one point of each light valve enters the projection lens 9 with a spread angle which is determined by an aperture diaphragm of the projection lens 9, whereby the image is formed at a conjugate point on the screen 10. FIG. 6 is a diagram for showing a state of a light beam having such spread angle. This spread is called an NA (numerical aperture) and, in the air, is defined by the following equation (3):

$$NA=\sin(\alpha) \qquad (3).$$

Here, α denotes a angle which is a half angle of the conic spread angle of the light beam emitted from one point on the light valve. In addition, between the NA and an F number a relation of the following equation (4) will be established:

$$F=1/(2\cdot NA) \qquad (4).$$

The F number which is determined by the projection lens 9 of the projection display apparatus in the present embodiment is F/3.5. The spread angle α becomes 8.2 degrees from the above equations (3) and (4), which is a spread angle in the air from the above definition. On the other hand, inside the prism, since a value for the refractive index of the glass material is 1.849, the spread angles α becomes 4.4 degrees. If the glass material is BK7 glass, by comparison, the spread angle is 5.4 degrees.

Further, since the projection lens 9 is telecentric on the light valve side (front side), a chief ray emitted from one point of the light valve 6R, 6G, or 6B becomes parallel to the optical axis AX, so that it suffices to detect the spread angle mentioned above for the chief ray.

For example, the chief ray of the B light emitted from one point B' on the light valve 6B is incident on the surface 3a of the prism 3 with the angle of incident θ0=52.0 degrees (see FIG. 6). The light emitted from the point B' progresses into the prism 3 as the conic light beam having the NA (the spread angle) of 4.4 degrees on one side with the chief ray as the center thereof. Here, if taking the NA into consideration, the smallest angle of incident with respect to the surface 3a is 47.6 degrees which is obtained by subtracting the spread angle of 4.4 degrees on one side in the prism from 52.0 degrees mentioned above. In case of a prism having a form as that of the prism 3, even if the BK 7 material is used as the glass material, the smallest angle of incident of the light beam having the same spread angle as mentioned above is 46.6 degrees. Thus, the total reflection condition is satisfied in either case.

Furthermore, in case of the glass material of the sample No. 6 (see FIG. 3) which is used in the present embodiment and in case of the BK7 glass, the maximum value for the spread angle of a light beam which can be totally reflected will be described. In case of the glass material of the sample No. 6, if the angle of incident of the chief ray incident on the surface 3a is 52.0 degrees, all the light beams having the NA up to 0.32 (F/1.56) can be totally reflected. On the other hand, when the prism 3 is formed of the BK7 glass, all the light beams having the NA up to 0.19 (F/2.6) can be totally reflected on the same condition of the angle of incident as that mentioned above. Consequently, if the glass material of the sample No. 6 is used, a light beam having a larger NA (spread angle) can be totally reflected, compared with the case in which an ordinary BK7 glass is used. In other words, so far as the total reflection is concerned, it is possible to emit a lighter(brighter) composed light by use of the glass material of the sample No. 6.

Next, description will be made with regard to the R light and the G light in FIG. 1. The R light and the G light which are transmitted from the B light reflecting dichroic film formed on the surface 3b (second surface) of the prism 3 pass through the adhesive layer 7 and the total reflection supporting layer 8 between the prism 3 and the surface 4a (first surface) of the prism 4a to enter the prism 4 from the surface 4a. Further, the R light and the G light continue to progress into the prism 4 and are color-separated into the R light which is reflected by the R light reflecting dichroic layer formed on the surface 4b (second surface) to further progress into the prism 4 and the G light which passes through the R light reflecting dichroic layer to progress into the prism 5. Then, the R light is subjected to the total reflecting effect by the total reflection supporting layer 8 which is formed on the surface 4a of the prism 4, and further progresses to exit from the surface 4c.

The present embodiment is characterized in that a glass material (see FIG. 3) having the absolute value of the photoelastic constant smaller than a predetermined value is used as the prism member, and the prism 3 and the prism 4 are bound and fixed together to be integrated over the entire joint surface therebetween by the adhesive layer. Here, an adhesive used as the adhesive layer 7 and a material for the total reflection supporting layer 8 will be described. An adhesive which is employed for general optical uses is used as the adhesive layer, which has the refractive index of n=1.4 to 1.6. For the total reflection of the R light on the surface 4a (first surface) of the prism 4, it is required to satisfy the above equation (2), so that the total reflection supporting layer 8 is formed on the surface 4a (first surface) of the prism 4 in the present embodiment. As a material for the total reflection supporting layer 8, TEFLON-AF (trade name) manufactured by Mitsui Dupon Fluorochemical Corp., for example, is used.

TEFLON-AF has the refractive index of n=1.29 to 1.31. Then, when a value for the refractive index of TEFLON-AF is set to 1.31 and $n_1$ to 1.31 and $n_0$ to 1.849, respectively, in the above equation (2), the angle of incidence for effecting the total reflection becomes 45.2 degrees or more. When the chief ray is incident on the surface 4a by the angle of incidence of 53.5 degrees, if the light beam has the spread of F/3.5, a half angle of the spread angle becomes 4.4 degrees, which can satisfactorily cause the total reflection.

By comparison, in case that the BK7 material is used, the chief ray is required to enter the surface 4a by the angle of incidence of 59.5 or more for causing the total reflection. Assuming that the spread of the light beam is F/3.5 with such angle of incidence, a half angle of the spread angle becomes 5.4 degrees, so that it becomes difficult to cause the total reflection. More specifically, if the BK7 material is used to cause the total reflection, as described according to the prior art, it is unavoidable to use the refractive index of the air for $n_1$, so that formation of an air gap is essential. Consequently, there arises a problem such as a registration shift.

Moreover, the composition prism in the present embodiment is not to be used limitedly in the projection display apparatus shown in Fig, but may be used, for example, as a color separating optical system of a TV camera. When it is used as such a color separating optical system of a TV camera, the polarizing beam splitter 2 shown in FIG. 2 is not employed, a light passing through the camera lens directly enters the composition prism, and image devices such as CCDs are provides instead of the light valves. With such arrangement, it is possible to obtain a color separating optical system with less pixel shift. In addition, since a fast(bright) lens having a smaller F number can be used, as mentioned above, it is obtain a TV camera with high brightness. Note that the TV camera will be described in a third embodiment.

Second Embodiment

Figure 7:
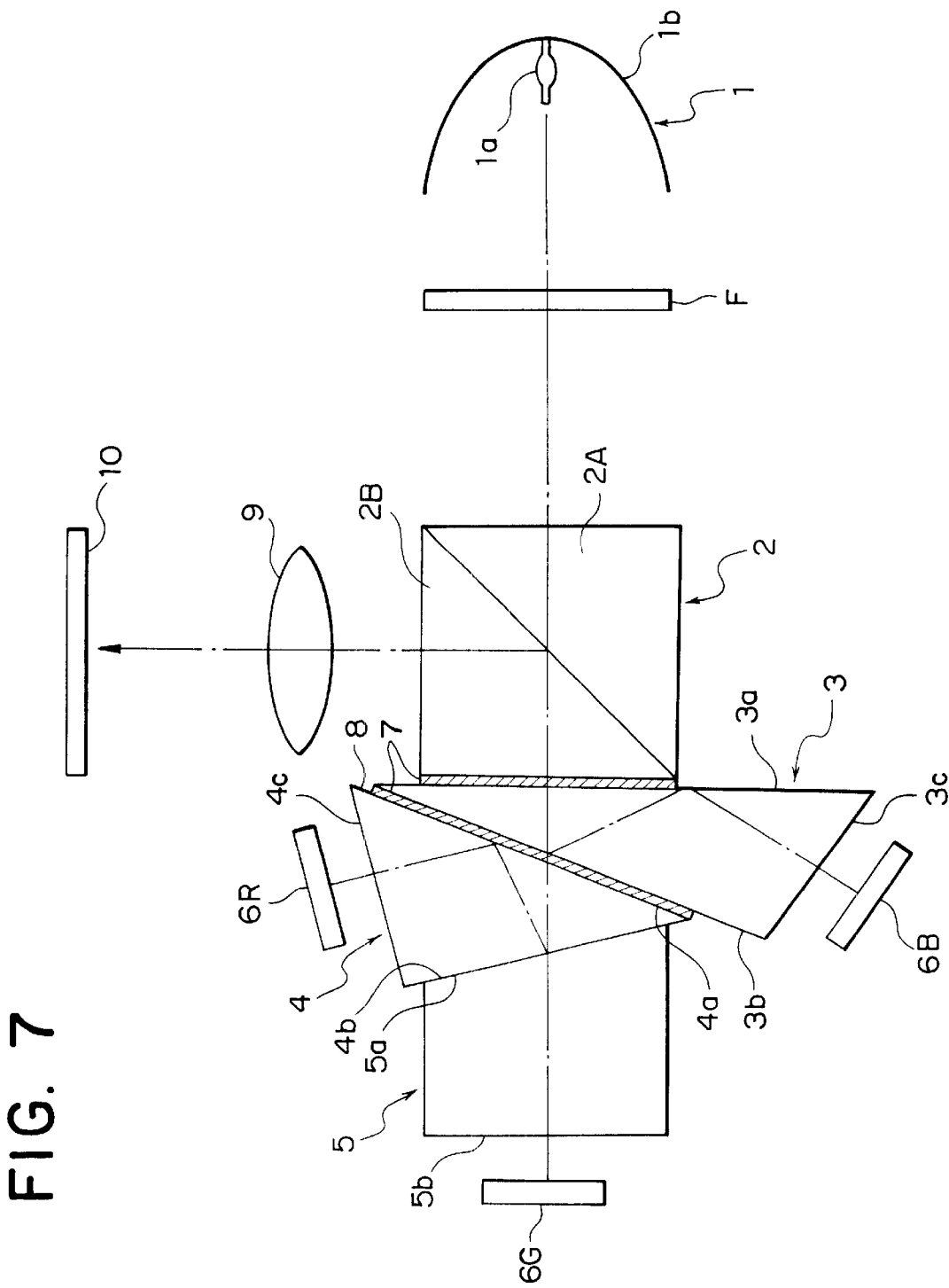
FIG. 7 is a diagram for showing the constitution of a projection display apparatus according to a second embodiment of the present invention.

FIG. 7 is a diagram for showing the constitution of a projection display apparatus according to the second embodiment of the present invention, which has the same basic structure as the projection display apparatus of the first embodiment, but is different in that the prism 2B of the polarizing beam splitter 2 and the surface 3a (first surface)

of the prism 3 of the color separating and composing prism are bound together along the entire joint surface therebetween by the adhesive layer. That is, the polarizing beam splitter 2 and the composition prism are integrated together without having a gap or a space therebetween. Same reference numerals are given to the identical portions to those of the first embodiment, and description thereof will be omitted.

Figure 8:
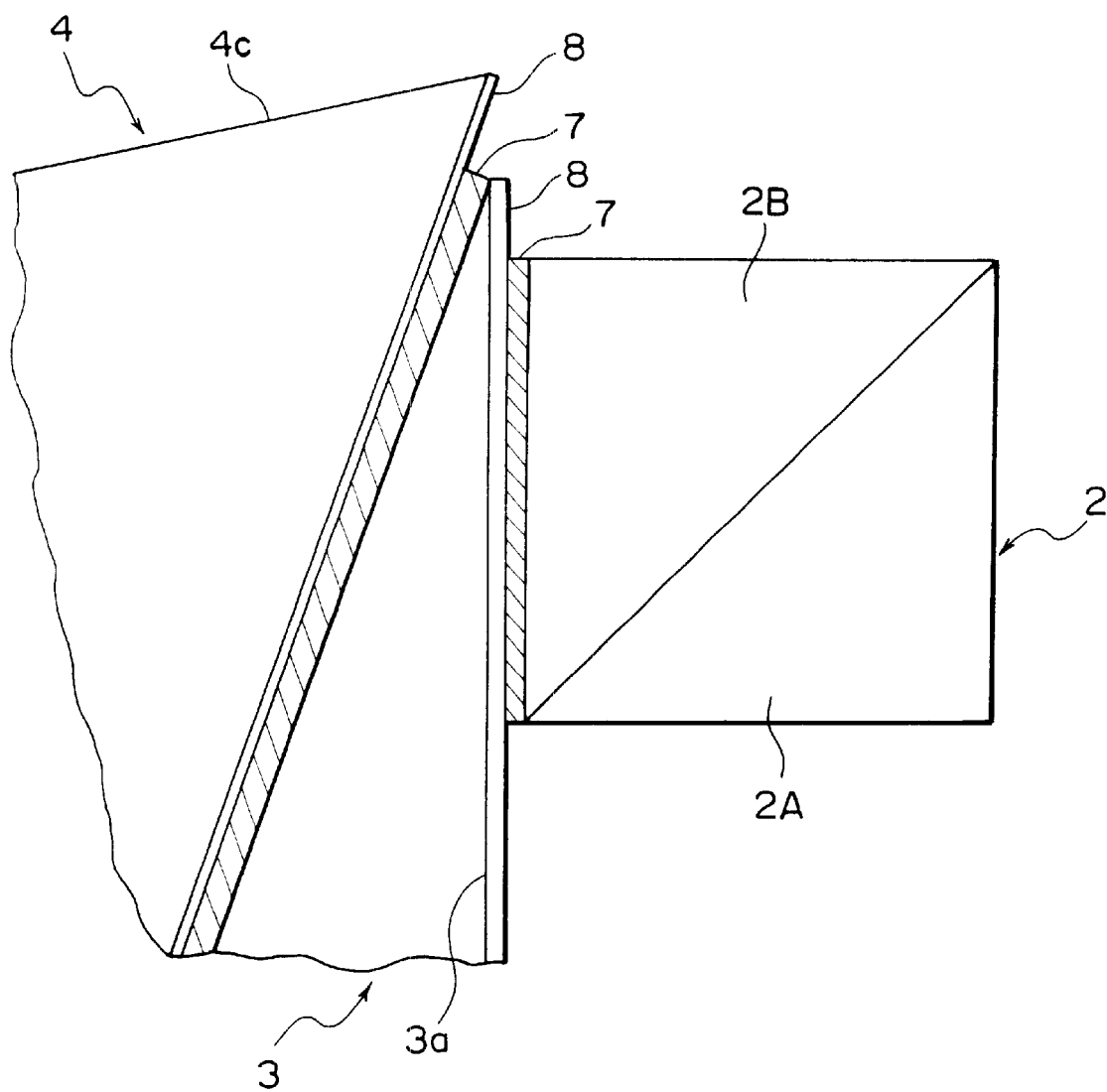
FIG. 8 is a diagram for explaining a joint portion between a polarizing beam splitter and a prism.
Figure 9:
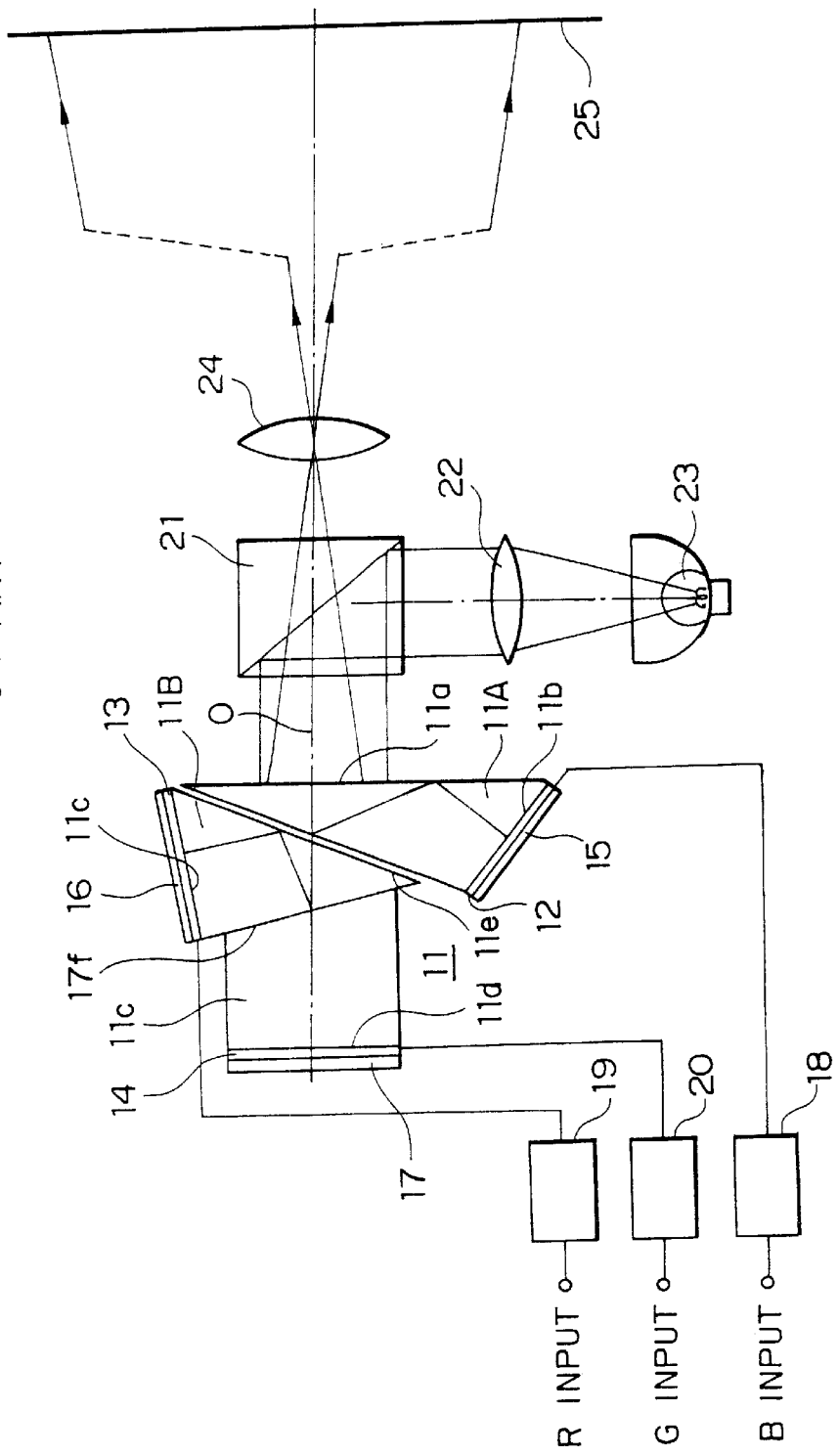
FIG. 9 is a diagram for showing the constitution of a conventional projection display apparatus.

Integration of the polarizing beam splitter 2 and the composing prism, which is a difference from the first embodiment, will be described with reference to FIG. 8. In FIG. 8, on the surface 3a (first surface) of the prism 3, there is formed a total reflection supporting layer 8 using the same material as that of the total reflection supporting layer formed on the surface 4a of the prism 4 in the first embodiment. Then, this total reflection supporting layer 8 and an overlapping adjacent surface from which the P-polarized light out of lights from the light source 1 of the prism 2B for constituting the polarizing beam splitter 2 is emitted are bound together by the use of an optical adhesive layer 7 along the entire joint surface therebetween (i.e., co-extensive with the entire overlap), to be integrated. Further, with respect to the prism 4 and the prism 3 out of the composing prism members, the total reflection supporting member 8 is formed on the surface 4a of the prism 4 and this surface 4a and the surface 3b are bound together by the use of the adhesive layer 7, like in the first embodiment. Note that the used adhesive layer is an ordinary optical adhesive.

As a material for the prisms 2A, 2B for forming the polarizing beam splitter 2 and the prisms 3, 4 and 5 for forming the composing prism, like in the first embodiment mentioned above, the glass material of the sample No. 6 (see FIG. 3) having the absolute value of a photoelastic constant of $1.5 \times 10^{-8}$ cm$^2$/N or less. By the use of a glass material having such characteristic, it is possible to minimize a change in the polarized state of the light passing through the prisms and the like, so as to obtain a projection image with an excellent contract on the screen 10.

Total reflection of the B light on the surface 3a (first surface) of the prism 3 will be described. When the glass material of the sample No. 6 is used, the refractive index $n_o$ of the prism is 1.849 and the refractive index of the total reflection supporting layer is 1.31. Consequently, in the above equation (2), $n_1$ is 1.31 and the angle of incidence is required to be equal to or more than 45.2 degrees for the surface 3a, in order to effect the total reflection. In the second embodiment, the angle of incidence of a chief ray which is parallel to the optical axis on the surface 3a is set to be 52.0 degrees, so that if the light beam has a spread angle of F/3.5, the angle of incident becomes 47.6 degrees, with subtraction of 4.4 degrees from 52.0 degrees. This angle is larger than the angle of 45.2 degrees which is required for causing the total reflection, so that the total reflection condition is fully satisfied.

Further, it is assumed that the glass material of the sample No. 1 (n=1.805) having the absolute value of the photoelastic constant within $1.5 \times 10^{-8}$ cm$^2$/N and the smallest refractive index in FIG. 3 is used as the prism member. In this case, in order to cause total reflection from the above equation (2), the angle of incidence is required to be equal to or more than 46.5 degrees. However, with the spread angle of F/3.5 (the half angle becomes 4.53 degrees), the total reflecting condition can be satisfied. Assuming that the BK7 glass is used as the prisms, by comparison, the angle of incidence is required to be equal to or more than 59. 5 degrees for causing the total reflection. However, if the light beam has the spread angle of F/3.5 for the angle of incidence of 52.0 degrees (the half angle is 5.4 degrees), the incident light can not be totally reflected so that the image can not be projected on the screen 10. In this case, integration becomes impossible, like in the conventional example, since it is inevitable to form a space between the composing prism and the polarizing beam splitter.

Third Embodiment

FIG. 10 is a diagram for showing the constitution of a camera according to the third embodiment of the present invention. In FIG. 10, a photographing lens 101 is a lens for forming images of an object OB respectively on CCD 106R, CCD 106G, and CCD 106B, whichwill be described later.

A light from the object through the photographing lens 101 enters a color separating and composing prism which is comprised of a first prism 103, a second prism 104 and a third prism 105. A B light reflecting dichroic film is for reflecting the B light and transmitting the R light and the G light is formed on a surface 103b (second surface) of the prism 103. On the other hand, a total reflection supporting layer 108 for transmitting the R light and the G light and totally reflecting a light having a predetermined angle of incidence is formed on a surface 104a (first surface) of the prism 104. Then, the overlapping total reflection supporting layer 108 and the B light reflecting dichroic film are bound together along the entire joint surface therebetween (i.e., the entire overlap) through an adhesive layer 107 co-extensive with the entire overlap, whereby the prism 103 and the prism 104 are integrated together.

Further, the adhesive is the same optical adhesive as that used with the first embodiment. Note that glass material for the prisms 103, 104, and 105 is the same glass material as that used in the first embodiment.

The surface 104b (second surface) of the prism 104 and the surface 105a (first surface) of the prism 105 are fixed to each other to be integrated by binding the R light reflecting dichroic film formed on the surface 104b and the surface 105a together through an optical adhesive.

A light incident on the prism 103 through the surface 103a (first surface) is color-separated into the B light which continues to progress as it is to be reflected by the B light reflecting dichroic film formed on the surface 103b (second surface) and the R light and the G light which continue to progress as they are to enter the prism 104 through the surface 104a (first surface) via the adhesive layer 107 and the total reflection supporting layer 108. The B light continues to progress as it is to be totally reflected by the surface 103a (first surface) and progresses further to exit from the surface 103c (third surface) to enter the CCD 106B which is provided in the vicinity of the exit surface.

On the other hand, the R light and the G light progressing into the prism 104 via the adhesive layer 107 and the total reflection supporting layer 108 continue to progress to reach a joint surface between the surface 104b (second surface) of the prism 104 and the surface 105a (first surface) of the prism 105. The surface 104b has an R light reflecting dichroic film, and the surface 104b and the surface 105a are bound together along the entire joint surface therebetween through the adhesive layer, whereby the prism 104 and the prism 105 are integrated. Then, the light is color-separated into the R light which is reflected by the R reflecting dichroic film and the G light which continues to progresses as it is. The G light progresses as it is into the prism 105 to exit from a predetermined exit surface 105b, and then enters the CCD 106G which is provided in the vicinity of the exit surface.

Note that, in this embodiment, the prism 105 takes the form of a quadrangular prism. However, the form of the prism 105 is not limited to this, but may take the form of a triangular prism. When the prism 105 is a triangular prism, the arrangement is not such that the G light progresses straight into the prism to be emitted from the exit surface, but that it is totally reflected once by a slanting surface of the triangular prism and then exits from a predetermined exit surface. However, the total reflection in this case is not related to the gist of this invention.

The R light which is reflected by the R light reflecting dichroic film progresses as it is through the prism 104, enters the surface 104a (first surface) of the prism 104, and is subjected to the total reflection there. The R light further progresses through the prism 104 to exit from the exit surface 104c (third surface) and then enters the CCD 106R which is provided in the vicinity of the exit surface 104c. Note that the details of the total reflecting effect on the surface 104a and the surface 103a are the same as those of the first embodiment, so that description thereof will be omitted.

Next, the CCDs will be described. The CCD 106R, CCD 106G and CCD 106B are monochromatic two-dimensional image pick-up devices in which a plurality of photoelectric converting elements are arranged in the form of matrix. Each photoelectric converting element outputs an analog signal in accordance with the intensity of the incident light. The CCD 106R only receives the R light which is separated by the color separating prism. Then, the CCD 106R outputs an analog signal RS which is corresponding to the incident R light to a composite signal generation circuit 110. On the other hand, the CCD 106G only receives the G light which is separated by the color separating prism. Then, the CCD 106G outputs an analog signal GS which is corresponding to the incident G light to the composite signal generation circuit 110. Also, the CCD 106B only receives the B light which is separated by the color separating prism. Then, the CCD 106B outputs an analog signal BS which is corresponding to the incident B light to the composite signal generation circuit 110.

A synchronous signal generation circuit 109 outputs synchronous signals to the CCD 106R, CCD 106G and CCD 106B, so as to control a reading timing of the analog signal of each CCD. The composite signal generation circuit 110 converts the analog signal RS, the analog signal GS and the analog signal BS into composite signals. Then, the composite signals are output to an external display DP.

Note that such arrangement is also feasible in which the adhesive in each of the foregoing embodiments serves also as a total reflection support member.

A glass material having the refractive index of 2.0 is employed as a material for the polarizing beam splitter and the color separating prism shown in FIG. 1, 7 or 10. As the glass material with the refractive index of 2.0, dense lanthanum flint glass (trade name: LaF35) is manufactured by Schott Co., Ltd. The photoelastic constant of the dense lanthanum flint glass is $0.73 \times 10^{-8}$ cm$^2$/N. For the adhesive, a material having the refractive index of 1.41 is used. As the adhesive with the refractive index of 1.41, there is one manufactured by ShinetsuKagaku Silicone Co., Ltd. (trade name: OF101).

With the above arrangement, the refractive index of the adhesive is sufficiently small with respect to the glass material. For this reason, on the surface 3a of the prism 3, on the surface 4a of the prism 4, on the surface 103a of the prism 103, or on the surface 104a of the prism 104, a light with a predetermined angle of incident is totally reflected.

As described above, according to the color separating and composing prism of the present invention, the first prism and the second prism, and the second prism and the third prism are bound together along the joint surfaces therebetween through the adhesive layers to be integrated. As a result, it is possible to prevent a registration shift which may caused by a gap, or the like, thereby effecting excellent color separation or composition all the time.

Also, according to the projection display apparatus of the present invention, the color separating and composing prism and the polarizing beam splitter are integrally formed, and the total reflection is possible inside the composition prism, or the like. As a result, it is possible to obtain a projection image which has resistance to a change in the ambient temperature, or the like, with less registration shift and with a stable excellent contrast all the time.

Also, according to a preferred embodiment, a glass material having an absolute value of the photoelastic constant smaller than the predetermined value is used for the prism members for forming the polarizing beam splitter and the composition prism. As a result, it is possible to suppress the generation of birefringence, and to minimize a change in the polarized state of a projection light passing through the prism members. Consequently, it is possible to obtain a projection image with an excellent contrast.

Also, according to a preferred embodiment, there is provided the total reflection supporting layer, so that the total reflection can be secured. As a result, it is possible to always conduct excellent color separation, color composition, or image display.

Also, according to the camera of the present invention, the first prism and the second prism, and the second prism and the third prism are bound together along the entire joint surfaces therebetween through the adhesive layers to be integrated. As a result, it is possible to prevent a registration shift which may caused by a gap, or the like, and to effect color separation of an image of the object with excellency.

Also, according to a preferred embodiment, the glass material having an absolute value of the photoelastic constant smaller than the predetermined value is used for the prism member which forms the composition prism. As a result, it is possible to suppress the generation of the birefringence, and to minimize a change in the polarized state of a photographing light passing through the prism members. Consequently, a photographing image with an excellent contrast can be obtained.

Also, according to a preferred embodiment, there is provided the total reflection supporting layer, so that the total reflection can be secured. As a result, it is possible to always conduct excellent color separation, color composition, or image display.

What is claimed is:

1. A color separating prism comprising:
   a first prism provided with a first surface on which a light is incident, a second surface having a first color reflecting dichroic film for reflecting a first color light and transmitting a second color light, and a third surface for emitting said first color light;
   a second prism provided with a first surface for transmitting said second color light which is transmitted through said second surface of said first prism, a second surface for reflecting said second color light, and a third surface for emitting said second color light which is totally reflected by said first surface after being reflected by said second surface, and integrally fixed to said first prism by an adhesive co-extensive with an entire overlap of said second surface of said first prism and said first surface of said second prism; and a total reflection supporting layer provided between the second surface of said first prism and the first surface of said second prism to allow total reflection on the first surface of said second prism.

2. A color separating prism according to claim 1, wherein a refractive index of said total reflection supporting layer is lower than that of said second prism and said adhesive.

3. A color separating prism according to claim 1, wherein said total reflection supporting layer is said adhesive for binding said first prism to said second prism.

4. A color separating prism according to claim 1, wherein an absolute value of a photoelastic constant of a glass material for forming said first prism and said second prism is within a range of $1.5 \times 10^{-8}$ cm$^2$/N, at the wavelengths of said first color light and said second color light.

5. A color separating prism comprising:

a first prism provided with a first surface on which a light is incident, a second surface having a first color reflecting dichroic film for reflecting a first color light, and transmitting a second color light and a third color light, and a third surface for emitting said first color light;

a second prism provided with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface, and integrally fixed to said first prism by an adhesive co-extensive with an entire overlap of said second surface of said first prism and said first surface of said second prism; and a third prism provided with a first surface for transmitting said third color light which is transmitted through the second surface of said second prism and a second surface for emitting said third color light, and integrally fixed to said second prism by an adhesive.

6. A projection display apparatus, comprising:

a polarizing device which converts a light from a light source into a polarized light beam having a predetermined direction of oscillation;

a color separating optical system which color-separates said polarized light beam emitted from said polarizing device into a first color light, a second color light, and a third color light;

a first reflection-type light valve which modulates the direction of oscillation of said first color light and reflects this light;

a second reflection-type light valve which modulates the direction of oscillation of said second color light and reflects this light;

a third reflection-type light valve which modulates the direction of oscillation of said third color light and reflects this light;

a color composing optical system which composes the lights emitted from said first reflection-type light valve, said second reflection-type light valve, and said third reflection-type light valve; and an analyzing optical system which analyzes the light emitted from said color composing optical system, wherein said color separating optical system further comprises:

a first prism provided with a first surface on which said polarized light beam emitted from said polarizing device is incident, a second surface having a first color reflecting dichroic film for reflecting said first color light and transmitting said second color light and said third color light, and a third surface for emitting said first color light;

a second prism provided with a first surface for transmitting said second color light and said third color light which are transmitted through said second surface of said first prism, a second surface having a second color reflecting dichroic film for reflecting said second color light and transmitting said third color light, and a third surface for emitting said second color light which is totally reflected by said first surface after being reflected by said second surface, and integrally fixed to said first prism by an adhesive co-extensive with an entire overlap of said second surface of said first prism and said first surface of said second prism;

a third prism provided with a first surface for transmitting said third color light transmitted through said second surface of said second prism, and a second surface for emitting said third color light; and a total reflection supporting layer provided between the second surface of said first prism and the first surface of said second prism to allow total reflection on the first surface of said second prism.

7. A projection display apparatus according to claim 6, wherein a refractive index of said total reflection supporting layer is lower than that of said second prism and said adhesive.

8. A projection display apparatus according to claim 6, wherein said total reflection supporting layer is said adhesive for binding said first prism to said second prism.

9. A projection display apparatus according to claim 6, wherein an absolute value of a photoelastic constant of a glass material for forming said polarizing device, said first prism and said second prism is within a range of $1.5 \times 10^{-8}$ cm$^2$/N, at the wavelengths of said first color light and said second color light.

10. A projection display apparatus according to claim 6, wherein said first prism is integrally fixed to said polarizing device by an adhesive co-extensive with an entire overlap of said first surface of said first prism and an adjacent surface of said polarizing device, and there is further provided a second total reflection supporting layer between said polarizing device and the first surface of said first prism, for allowing total reflection on the first surface of said first prism.

11. A projection display apparatus according to claim 10, wherein a refractive index of said second total reflection supporting layer is lower than that of said first prism and said second adhesive.

12. A projection display apparatus comprising:

a polarizing device which converts a light from a light source into a polarized light beam having a predetermined direction of oscillation;

a color separating optical system which color-separates the polarized light beam emitted from said polarizing device into a first color light, a second color light, and a third color light;

a first reflection-type light valve which modulates the direction of oscillation of said first color light and reflects this light;

a second reflection-type light valve which modulates the direction of oscillation of said second color light and reflects this light;

a third reflection-type light valve which modulates the direction of oscillation of said third color light and reflects this light;

a color composing optical system which composes the lights emitted from said first reflection-type light valve, said second reflection-type light valve, and said third reflection-type light valve; and an analyzing optical system which analyzes the light emitted from said color composing optical system, wherein said color separating optical system comprises:
a first prism provided with a first surface on which the polarized light beam emitted from said polarizing device is incident, a second surface having a first color reflecting dichroic film for reflecting said first color light and transmitting said second color light and said third color light, and a third surface for emitting said first color light, and integrally fixed to said polarizing device by an adhesive co-extensive with an entire overlap of said first surface of said first prism and an adjacent surface of said polarizing device;

a second prism provided with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface;

a third prism provided with a first surface for transmitting said third color light transmitted through said second surface of said second prism, and a second surface for emitting said third color light; and a total reflection supporting layer provided between said polarizing device and the first surface of said first prism to allow total reflection on the first surface of said first prism.

13. A projection display apparatus comprising:
a polarizing device which converts a light from a light source into a polarized light beam having a predetermined direction of oscillation;

a first prism provided with a first surface on which the polarized light beam emitted from said polarizing device is incident, a second surface having a first color reflecting dichroic film for reflecting said first color light and transmitting said second color light and said third color light, and a third surface for emitting said first color light, and integrally fixed to said polarizing device by an adhesive co-extensive with an entire overlap of said first surface of said first prism and an adjacent surface of said polarizing device;

a second prism provided with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface, and integrally fixed to said first prism by an adhesive co-extensive with an entire overlap of said second surface of said first prism and said first surface of said second prism;

a third prism provided with a first surface for transmitting said third color light which is transmitted through the second surface of said second prism, and a second surface for emitting said third color light, and integrally fixed to said second-prism by an adhesive;

a first reflection-type light valve which modulates the direction of oscillation of said first color light emitted from said first prism and reflects this light;

a second reflection-type light valve which modulates the direction of oscillation of said second color light emitted from said second prism and reflects this light;

a third reflection-type light valve which modulates the direction of oscillation of said third color light emitted from said third prism and reflects this light;

a color composing optical system which composes the lights emitted from said first reflection-type light valve, said second reflection-type light valve, and said third reflection-type light valve; and an analyzing optical system which analyzes the light emitted from said color composing optical system.

14. A method of manufacturing a color separating prism comprising:
providing a first prism with a first surface on which a light is incident, a second surface having a first color reflecting dichroic film for reflecting a first color light and transmitting a second color light, and a third surface for emitting said first. color light;

providing a second prism with a first surface for transmitting said second color light which is transmitted through the second surface of said first prism, a second surface for reflecting said second color light, and a third surface for emitting said second color light which is totally reflected by said first surface after being reflected by said second surface, integrally fixed to said first prism by an adhesive co-extensive with an entire overlap of said second surface of said first prism and said first surface of said second prism; and providing a total reflection supporting layer between the second surface of said first prism and the first surface of said second prism to allow total reflection on the first surface of said second prism.

15. A method of manufacturing a color separating prism according to claim 14, wherein a refractive index of said total reflection supporting layer is lower than that of said second prism and said adhesive.

16. A method of manufacturing a color separating prism according to claim 14, wherein said total reflection supporting layer is said adhesive for binding said first prism to said second prism.

17. A method of manufacturing a color separating prism according to claim 14, wherein an absolute value of a photoelastic constant of a glass material for forming said first prism and said second prism is within a range of $1.5 \times 10^{-8}$ cm$^2$/N, at the wavelengths of said first color light and said second color light.

18. A method of manufacturing a color separating prism, comprising:
providing a first prism with a first surface on which a light is incident, a second surface having a first color reflecting dichroic film for reflecting a first color light and transmitting a second color light and a third color light, and a third surface for emitting said first color light;

providing a second prism with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface, integrally fixed to said first prism by an adhesive co-extensive with an entire overlap of said second surface of said first prism and said first surface of said second prism; and providing a third prism with a first surface for transmitting said third color light transmitted through the second surface of said second prism and a second surface for emitting said third color light, integrally fixed to said second prism by an adhesive.

19. A method of manufacturing a projection display apparatus, comprising:

providing a polarizing device which converts a light from a light source into a polarized light beam having a predetermined direction of oscillation;

providing a color separating optical system which color-separates the polarized light beam emitted from said polarizing device into a first color light, a second color light, and a third color light;

providing a first reflection-type light valve which modulates the direction of oscillation of said first color light and reflects this light;

providing a second reflection-type light valve which modulates the direction of oscillation of said second color light and reflects this light;

providing a third reflection-type light valve which modulates the direction of oscillation of said third color light and reflects this light;

providing a color composing optical system which composes the lights emitted from said first reflection-type light valve, said second reflection-type light valve, and said third reflection-type light valve;

providing an analyzing optical system which analyzes the light emitted from said color composing optical system, wherein said providing the color separating optical system further comprises:

providing a first prism with a first surface on which the polarized light beam emitted from said polarizing device is incident, a second surface having a first color reflecting dichroic film for reflecting said first color light and transmitting said second color light and said third color light, and a third surface for emitting said first color light;

providing a second prism with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface, integrally fixed to said first prism by an adhesive co-extensive with an entire overlap of said second surface of said first prism and said first surface of said second prism;

providing a third prism with a first surface for transmitting said third color light transmitted through the second surface of said second prism and a second surface for emitting said third color light; and providing a total reflection supporting layer between the second surface of said first prism and the first surface of said second prism to allow total reflection on the first surface of said second prism.

20. A method of manufacturing a projection display apparatus according to claim 19, wherein a refractive index of said total reflection supporting layer is lower than that of said second prism.

21. A method of manufacturing a projection display apparatus according to claim 19, wherein said total reflection supporting layer is said adhesive that fixes said first prism to said second prism.

22. A method of manufacturing a projection display apparatus according to claim 19, wherein an absolute value of a photoelastic constant of a glass material for forming said polarizing device, said first prism and said second prism is within a range of $1.5 \times 10^{-8}$ cm$^2$/N, at the wavelengths of said first color light and said second color light.

23. A method of manufacturing a projection display apparatus according to claim 19, wherein said first prism is integrally fixed to said polarizing device by an adhesive co-extensive with an entire overlap of said first surface of said first prism and an adjacent surface of said polarizing device, and further providing a second total reflection supporting layer between said polarizing device and the first surface of said first prism, for allowing total reflection on the first surface of said first prism.

24. A method of manufacturing a projection display apparatus according to claim 23, wherein a refractive index of said second total reflection supporting layer is lower than that of said first prism and said adhesive.

25. A method of manufacturing a projection display apparatus, comprising:

providing a polarizing device which converts a light from a light source into a polarized light beam having a predetermined direction of oscillation;

providing a color separating optical system which color-separates the polarized light beam emitted from said polarizing device into a first color light, a second color light, and a third color light;

providing a first reflection-type light valve which modulates the direction of oscillation of said first color light and reflects this light;

providing a second reflection-type light valve which modulates the direction of oscillation of said second color light and reflects this light;

providing a third reflection-type light valve which modulates the direction of oscillation of said third color light and reflects this light;

providing a color composing optical system which composes the lights emitted from said first reflection-type light valve, said second reflection-type light valve, and said third reflection-type light valve; and providing an analyzing optical system which analyzes the light emitted from said color composing optical system, wherein said providing the color separating optical system further comprises:

providing a first prism with a first surface on which the polarized light beam emitted from said polarizing device is incident, a second surface having a first color reflecting dichroic film for reflecting said first color light and transmitting said second color light and said third color light, and a third surface for emitting said first color light, integrally fixed to said polarizing device by an adhesive co-extensive with an entire overlap of said first surface of said first prism and an adjacent surface of said polarizing device;

providing a second prism with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface;

providing a third prism with a first surface for transmitting said third color light transmitted through the second surface of said second prism, and a second surface for emitting said third color light; and providing a total reflection supporting layer between said polarizing device and the first surface of said first prism to allow total reflection on the first surface of said first prism.

26. A method of manufacturing a projection display apparatus, comprising:

providing a polarizing device which converts a light from a light source into a polarized light beam having a predetermined direction of oscillation;

providing a first prism with a first surface on which the polarized light beam emitted from said polarizing device is incident, a second surface having a first color reflecting dichroic film for reflecting said first color light and transmitting said second color light and said third color light, and a third surface for emitting said first color light, integrally fixed to said polarizing device by an adhesive co-extensive with an entire overlap of said first surface of said first prism and an adjacent surface of said polarizing device;

providing a second prism with a first surface for transmitting said second color light and said third color light which are transmitted through the second surface of said first prism, a second surface having a second color reflecting dichroic film for reflecting said second color light and transmitting said third color light, and a third surface for emitting said second color light which is totally reflected by said first surface after being reflected by said second surface, integrally fixed to said first prism by an adhesive co-extensive with an entire overlap of said second surface of said first prism and said first surface of said second prism;

providing a third prism with a first surface for transmitting said third color light transmitted through the second surface of said second prism, and a second surface for emitting said third color light, integrally fixed to said second prism by an adhesive;

providing a first reflection-type light valve which modulates the direction of oscillation of said first color light emitted from said first prism and reflecting this light;

providing a second reflection-type light valve which modulates the direction of oscillation of said second color light emitted from said second prism and reflects this light;

providing a third reflection-type light valve which modulates the direction of oscillation of said third color light emitted from said third prism and reflects this light;

providing a color composing optical system which composes the lights emitted from said first reflection-type light valve, said second reflection-type light valve, and said third reflection-type light valve; and providing an analyzing optical system which analyzes the light emitted from said color composing optical system.

* * * * *